US006243698B1

(12) United States Patent
Powers et al.

(10) Patent No.: US 6,243,698 B1
(45) Date of Patent: Jun. 5, 2001

(54) EXTENSIBLE DATABASE RETRIEVAL AND VIEWING ARCHITECTURE

(75) Inventors: Craig R. Powers, San Carlos; Vladimir Gorelik, Palo Alto, both of CA (US)

(73) Assignee: Sagent Technology, Inc., Mountain View, CA (US)

( * ) Notice: Subject to any disclaimer, the term of this patent is extended or adjusted under 35 U.S.C. 154(b) by 0 days.

(21) Appl. No.: 09/455,839

(22) Filed: Dec. 7, 1999

Related U.S. Application Data

(63) Continuation of application No. 08/953,392, filed on Oct. 17, 1997, now Pat. No. 6,038,558.

(51) Int. Cl.[7] .................................................. G06F 17/30
(52) U.S. Cl. ........................................ 707/2; 707/1; 707/4
(58) Field of Search ................................. 707/10, 103, 3, 707/5, 1, 2, 4

(56) References Cited

U.S. PATENT DOCUMENTS

| 5,960,214 | * | 9/1999 | Sharpe et al. ........................ 395/835 |
| 6,038,558 | * | 3/2000 | Powers et al. ........................... 707/2 |

* cited by examiner

*Primary Examiner*—Thomas Black
*Assistant Examiner*—Frantz Coby
(74) *Attorney, Agent, or Firm*—Blakely, Sokoloff, Taylor & Zafman LLP

(57) ABSTRACT

One embodiment of the invention includes an architecture for extending the data requesting and data viewing capabilities of a database system. Data from the database is requested and viewed using a plan. The plan defines the steps to perform to request and view the data. The extensible architecture allows for the relatively easy addition of new steps for use in the database retrieval and viewing system. In one system, each step includes executable code for accessing, manipulating and/or outputting data. Each step conforms to a predefined interface that allows the step to be used in a plan, manipulate data received from another step (if necessary), and output data to another step (if necessary). By generating steps that conform to the predefined interface, developers can extend the functionality of the data retrieval and viewing application. In one embodiment, the interface defines the type of step, the number of inputs and outputs to the steps, the type of record accessing characteristics are best used by the step, and whether the step uses the original records or copies of the records. Importantly, the interface does not need to define the actual data manipulation performed by the step. Therefore, the step's internal operations are independent of the operations performed by the application. This separation allows developers to generate powerful steps without having to modify the application to support the new steps.

1 Claim, 2 Drawing Sheets

EXTENSIBLE DATABASE RETRIEVAL AND VIEWING ARCHITECTURE

This application is a Continuation of application Ser. No. 08/953,392, filed Oct. 17, 1997, and now U.S. Pat. No. 6,038,558 entitled "Extensible Database Retrieval and Viewing Architecture", by inventors Craig R. Powers and Vladimir Gorelik, which is incorporated herein by reference in its entirety.

RELATED APPLICATIONS

This application relates to, and incorporates by reference, the following applications:

"Data Descriptions in a Database System," having the inventors Vladimir Gorelik, Craig R. Powers, John E. Zicker, and Nicholas F. Engelhardt, having Ser. No. 60/028,640, and filing date Oct. 18, 1996;

"Database Repository With Deferred Transactions," having the inventors Craig R. Powers, Terris, J. Linenbach, Vladimir Gorelik, Tana C. Netsch, Robert E. Powers, and having Ser. No. 08/757,719, and filing date Nov. 26, 1996 now U.S. Pat. No. 5,930,754; and, "Extensible Database Retrieval and Viewing Architecture," having the inventors of Craig R. Powers, and Vladimir Gorelik having Ser. No. 60/028,725, and filing data Oct. 18, 1996.

BACKGROUND OF THE INVENTION

Datamarts are types of software programs that allow users to aggregate, sort, sift, and manipulate data from a number of sources. These sources of data can be, for example, databases or internet web servers. Users describe the types of data they wish the datamarts to access, from which source, and how that data should be manipulated.

In some systems, the user defines a script for accessing the data in the data sources. The scripts typically include data access instructions. The interfaces for generating such scripts are usually text based and do not allow the user to visualize the flow of the data accesses and the manipulations on the data.

Therefore, what is needed is an improved data access description method and apparatus that more clearly shows the data being accessed and the types of operations being performed on that data.

SUMMARY OF THE INVENTION

One embodiment of the invention includes an architecture for extending the data requesting and data viewing capabilities of a database system. In one embodiment, data from the database is requested and viewed using a plan. The plan defines the steps to perform to request and view the data. The extensible architecture allows for the relatively easy addition of new steps for use in the database retrieval and viewing system.

In one embodiment, each step includes executable code for accessing, manipulating and/or outputting data. Each step conforms to a predefined interface that allows the step to be used in a plan, manipulate data received from another step (if necessary), and output data to another step (if necessary). By generating steps that conform to the predefined interface, developers can extend the functionality of the data retrieval and viewing application. In one embodiment, the interface defines the type of step, the number of inputs and outputs to the steps, the type of record accessing characteristics are best used by the step, and whether the step uses the original records or copies of the records. Importantly, the interface does not need to define the actual data manipulation performed by the step. Therefore, the step's internal operations are independent of the operations performed by the application. This separation allows developers to generate powerful steps without having to modify the application to support the new steps.

A BRIEF DESCRIPTION OF THE DRAWINGS

The figures illustrate the invention by way of example, and not limitation. Like references indicate similar elements.

THE DESCRIPTION a. System Description

Figure 1:
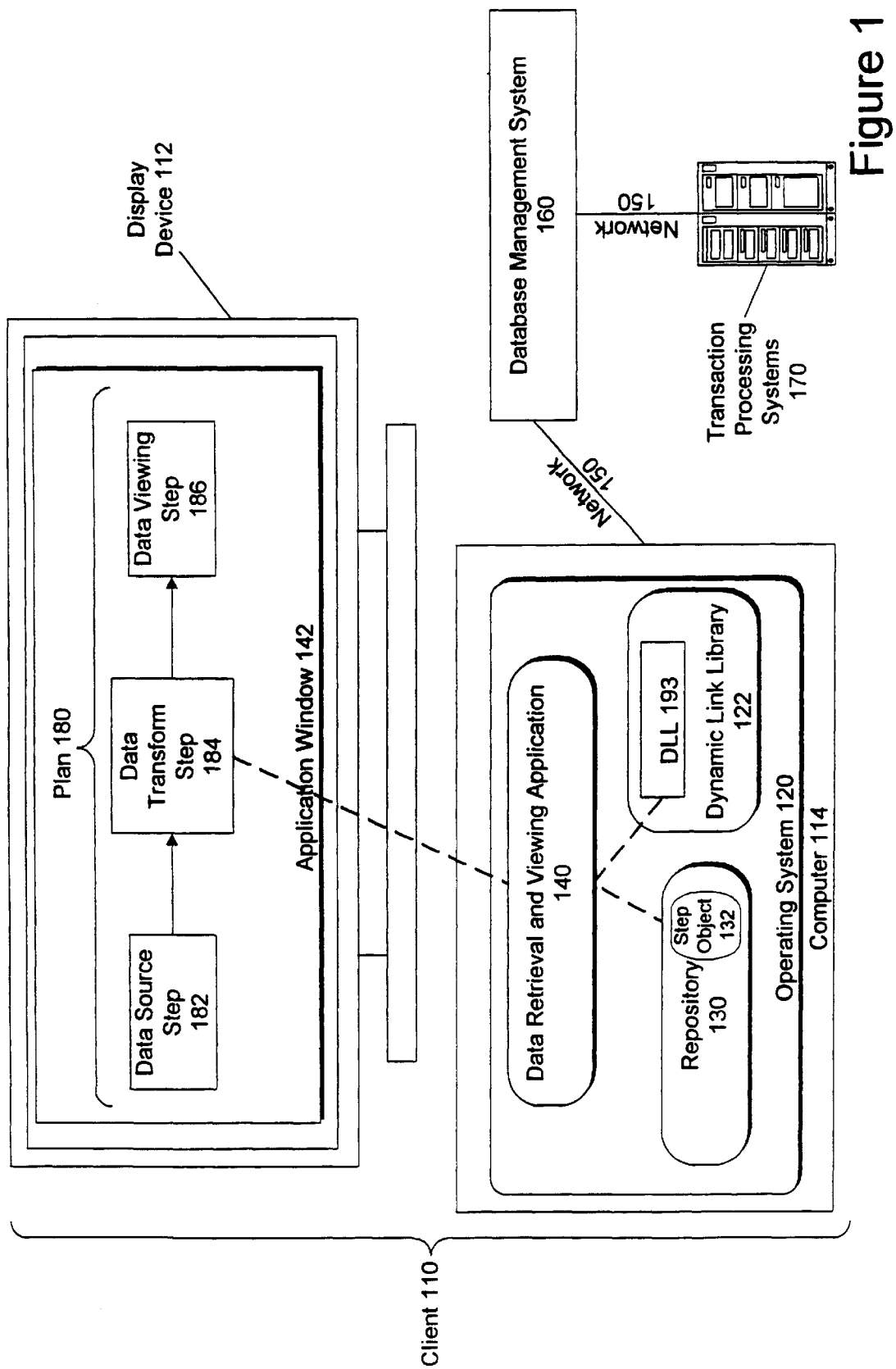
FIG. 1 illustrates a data retrieval and viewing system with an extensible architecture.

FIG. 1 illustrates a data retrieval and viewing system with an extensible architecture. The following first lists the elements in FIG. 1 and then describes each of the elements.

FIG. 1 includes a transaction processing system 170, a database management system 160, and a client 110. The client 110 includes a computer 114 and a display device 112. The computer 114 includes an operating system 120, a dynamic link library 122, a repository 130, and a data retrieval and view application 140. The application 140 causes the display device 112 to display an application window 142. The application window 142 shows a graphical representation of a plan 180. The plan 180 includes a data source step 182, a data transform step 184, and a data viewing step 186. The data transform step 184 is associated with a step object 132 in the repository 130 and a dynamic link library executable (DLL) 193. The client 110 communicates over the network 150 with the database management system 160. The database management system 160 communicates over network 150 with the transaction processing system 170.

The following describes the data entry and warehousing systems of FIG. 1. The online transaction processing systems 170 collect data for use by the database management system 160. The online transaction processing systems 170 are often optimized for data entry. The database management system 160 includes a system for accessing and analyzing existing data. In one embodiment, the database management system 160 includes a data warehouse where corporate data is consolidated and fed to smaller data warehouses (called data marts). However, in the example system of FIG. 1, the data warehouse and data mart functions are both performed by the database management system 160. Oracle Corporation, of Redwood Shores, Calif., provides data warehouses and online transaction processing systems 170. In one embodiment, the database management system 160 resides on a separate computer than the client 110 or the online transaction processing system 170. Other embodiments of the invention support other hardware and software configurations, such as the client 110 and the database management system 160 sharing the same database management system (e.g., a database system from Oracle, Inc. of Redwood Shores, Calif.). In this embodiment, the client 110 uses the database system as the storage portion of the repository 130.

The following describes the client 110 in greater detail. The client 110 includes a computer 114 and a display device 112. Various computers 114 used in various embodiments of the invention include IBM-PC compatible computers, Macintosh™ computers, and workstations from Sun Microsystems, Inc., Hewlett-Packard and Silicon Graphics, Inc. The display device 112 includes a video monitor for displaying graphical and textual information generated by the data retrieval and viewing application 140 and the operating system 120.

The client's 110 operating system 120 includes the Windows NT™ operating system. Other embodiments of the invention use other operating systems, such as Unix, Max OS™, and Windows 3.1™. Importantly, in one embodiment, the operating system provides applications with an interface for easily adding additional features to the applications.

In one embodiment, the operating system supports the dynamic link library 122 for extending the functionality of an application. In one embodiment, the operating system 120 supports the Microsoft Common Object Model (COM) interface.

The COM interface allows each DLL to support multiple interfaces. The COM interface allows the application 140 to interrogate a COM object to determine which interfaces are supported. In one embodiment of the invention, this feature is exploited to allow different steps to provide different functions. For example, a step can require a single pass or a multiple pass examination of the input data; each type of pass using a different interface. For example, a step may be more efficiently performed if multiple records are accessed simultaneously (e.g., a sorting transform step), while a different step may be more efficiently performed processing only a single record at a time (e.g., a splitter) in a single pass. Another example occurs where a step uses the original data or uses copies of the original data, each type of data used is implemented using a different interface.

The COM interface also allows COM objects to be universally registered for use by applications in the operating system 120. Using the COM globally unique identifier (GUID) system, the client 110 need not know where the object is in the client 110. The registration process also allows the COM object to communicate the name of the object to the application 140.

The COM interface also allows a developer to have a step prompt the user for input as part of the execution of that step. Further, the COM interface allows the step to provide the information to the application 140. In one embodiment, the application 140 ensures that the user information is kept on the client 110 or the repository 130 once the information is obtained from the user so that the user is not prompted in future executions of that step in the corresponding plan 180.

The following describes the data retrieval and viewing features of the client 110. The data retrieval and viewing application 140 accesses data from the database management system 160 using the plan 180. Thus, a user creates a plan 180 to command the application 140 to retrieve, process and display the data from the database management system 160. The plan 180 includes a number of steps. Each step in the plan 180 defines either a source of data, a data transform, or a sink of data. The example plan 180 of FIG. 1 includes a data source step 182, a data transform step 184 and a data viewing step 186. The data source step 182 defines the source of the data to be used by the plan 180 (e.g., a definition of a specific table and column in the database management system 160). The data transform 184 defines how that sourced data is to be transformed (e.g., a definition of a conversion from English pounds to American dollars). The data viewing step 186 is an example of a data sink. The data viewing step 186 defines where the data from the data transform step 184 should be output. For example, the data viewing step 186 may cause a table to be displayed in the application window 142.

The repository 130 keeps the plans 180 and the mappings of the data in the database management system 160 to data in the application 140. The repository 130 also holds the definitions of a set of steps that can be used in a plan 180. A step object 132 corresponds to each step that can be used. Although the repository 130 is shown in the client 110, in other embodiments of the invention have the repository 130 in a second computer, or spread between the client 110 and a second computer. For example, in one embodiment, the client 110 includes the portion of the access functions of the repository 130 while a second computer includes the storage functions of the repository 130. In this embodiment, the storage portion of the repository 130 is implemented using a database server such as is available from Oracle, Inc. or Sybase, Inc., both of California.

In one embodiment, each step is created and used according to a COM interface. For example, the data transform step 184 is associated with step object 132 and a DLL 193. The step object 132 is used within the application 140 to reference the DLL 193. The DLL 193 includes functions used by the application 140 to perform a specific transform. Therefore, the functionality of the application 140 can be easily extended by defining new steps including their corresponding DLL 193 and step object 132.

b. Step Design and Implementation

Figure 2:
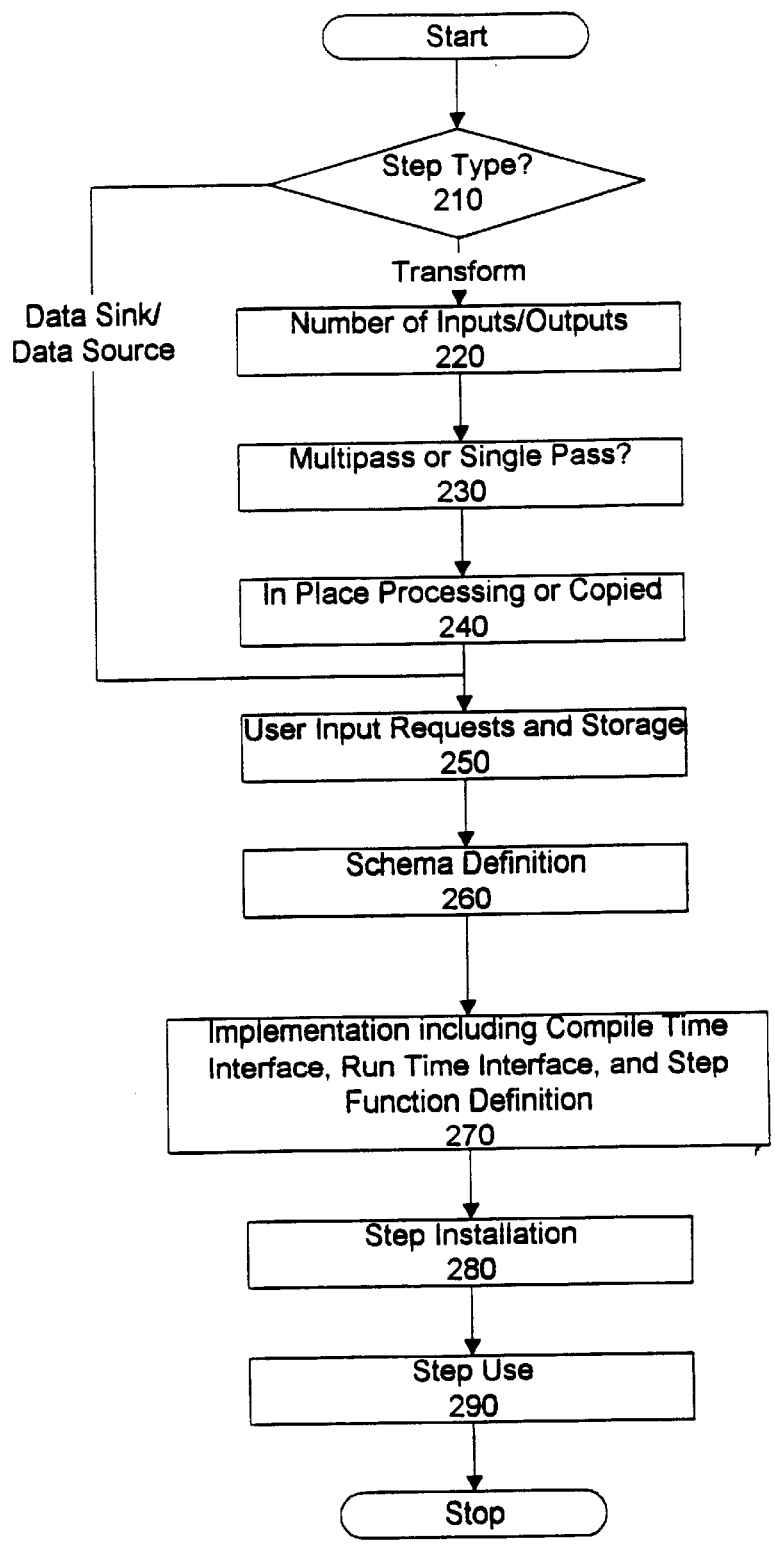
FIG. 2 illustrates one embodiment of a method of defining and implementing a new step.

FIG. 2 illustrates one embodiment of a method of defining and implementing a new step for use in the system of FIG. 1. This embodiment is implemented using the COM based interface defined by Microsoft Corporation, Inc., however, other embodiments of the invention are implemented using other architecture extension systems, such as OpenDoc™, available from Apple Computer, Inc.

The following describes a method of creating a new step using the COM interface. However, in one embodiment, a C++ library is provided that removes some of the more tedious steps of defining the new step. However, this C++ library technique is a subset of the following steps.

The developer starts with an idea of a specific type of step to add to the application 140. The function of the step is first defined (e.g., a sorting function), then the developer performs steps 210 through step 270.

Block 210 through block 260 are performed by a developer to define how the new step will function. At block 210, the developer decides which type of step to create (e.g., transform, data sink or data source). Block 220 through block 240 are executed if the step is a transform.

At block 220, the developer decides the number of inputs to the step and the number of outputs. For example, if the transform performs a split of any received data, then the transform will have one input and two outputs. If the transform performs a union of any received data, then the transform has two inputs and one output.

At block 230, the developer decides whether the step will use the single pass or the multiple pass interface.

At block 240, the developer decides whether the step will use in place processing of received data or copies of the received data.

At block 250, the developer decides whether any user input need be obtained prior to the use of the step within the plan. If user input is required, the developer decides how the user information is stored. In one embodiment, the repository 130 stores this information. In one embodiment, the user data is stored as a property list. Each property has a name and a value. The developer also defines the user interface to prompt the user for the information (e.g., a dialog box). In one embodiment, the developer defines the user interface by writing executable code that provides a user interface when executed. In one embodiment, the executable code includes calls to the operating system to help provide the user interface.

At block 260, the developer defines the data schema of the data manipulated in the step. The data schema defines how the data is organized. If the step is a sink, then block 260 need not be performed.

At block 270, the developer writes the code to provide the various interfaces used by the application 140 and the step's function. The developer writes the compile time interface, the run time interface and the step function definition. The compile time interface defines the output of the step (not necessary if the step is a data sink). In one embodiment, the compile time interface defines the fields and the field types of the data output by the step using a record descriptor. The record descriptor describes the records output from the step. A record descriptor includes the names of the fields, the types of the fields, and the positions of the fields in the records. The run time interface is what is called by the application 140 when the DLL 193 is executed. The run time interface is the main entry point to the DLL 193 called by the application 140 when the plan 180 is executed. The step's function definition is the executable code that causes the data to be retrieved, transformed, or output. For example, the step's function definition is the sort function for a sorting step.

From block 270, the developer can compile the definition to generate the DLL 193. The developer also receives a unique identifier for the DLL 193, e.g. a GUID such as a class identifier, for use by the operating system 120.

After the developer has generated the DLL 193, a user can install and use the new step. At block 280, the user uses an administrative tool to install the new step for use by the application 140. The administrative tool includes a software program that creates the step object 132 in the repository. The step object 132 includes the reference to the DLL 193 (e.g., a GUID), and a user defined name for the new step. In another embodiment, the step object 132 also includes a reference to a developer supplied icon for use in graphically displaying the plan 180. In another embodiment, the executable code is not stored in a DLL 193 but is stored in the repository 130. Once the step is installed, a user can then include the step in a plan 180.

In block 290, the new step is used. To use the step, the user uses the application 140 to include the new step in a plan 180. In one embodiment, a pull data processing model is used to execute a plan 180. That is, the last step in the plan 180 is asked to execute first. Then, all the steps that provide data to that last step are asked to execute. Then, all the steps that provide data to those steps are asked to execute. This continues until the source steps are reached. Thus, when the plan is executed, the step object 132 is asked for its output from the next step in the plan 180. The step object 132, using its references to the DLL 193, causes the DLL 193 to execute, which will cause the DLL 193 to request its input from any preceding steps in the plan 180. The DLL 193 then process the received data. Upon completion of execution, the DLL 193 provides the next step with the output formatted according to the run time interface.

Thus, a new step has been defined, implemented and used.

What is claimed is:

1. A method of accessing data in a data source using a computer system:

accessing a data access description from a storage, the data access description employing a predetermined interface defining a number of inputs and a number of outputs for use of the data description, the data access description defining an operation to be performed on the data in a series of executable steps; and executing the data access description causing the data to be accessed from a database and manipulated according to the definition of the operation independent of operations performed by an application designed to access the database.

* * * * *